US009569817B2

(12) United States Patent
Matsui (10) Patent No.: US 9,569,817 B2
(45) Date of Patent: Feb. 14, 2017

(54) IMAGE PROCESSING APPARATUS, IMAGE PROCESSING METHOD, AND NON-TRANSITORY COMPUTER READABLE STORAGE MEDIUM

(71) Applicant: CANON KABUSHIKI KAISHA, Tokyo (JP)

(72) Inventor: Shun Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/952,502

(22) Filed: Nov. 25, 2015

(65) Prior Publication Data

US 2016/0155213 A1 Jun. 2, 2016

(30) Foreign Application Priority Data

Nov. 28, 2014 (JP) ................. 2014-242302

(51) Int. Cl.
*G06T 3/00* (2006.01)
*G06T 3/40* (2006.01)
(Continued)

(52) U.S. Cl.
CPC ........... *G06T 3/4007* (2013.01); *G06K 7/1469* (2013.01); *G06T 5/20* (2013.01); *H04N 7/014* (2013.01); *H04N 7/0135* (2013.01); *H04N 9/045* (2013.01); *H04N 19/80* (2014.11); *G06T 5/003* (2013.01); *H04N 19/132* (2014.11); *H04N 2201/04787* (2013.01)

(58) Field of Classification Search
CPC .......... G06T 3/40; G06T 3/4007; G06T 5/003; G06T 5/20; G06T 5/30; H04N 7/0135; H04N 7/014; H04N 7/0142; H04N 7/0145; H04N 19/132; H04N 19/80; H04N 2201/04787; G06K 7/1469
See application file for complete search history.

(56) References Cited

U.S. PATENT DOCUMENTS 4,885,786 A * 12/1989 Anderson ............ H04N 1/3935
345/671
5,214,751 A * 5/1993 Robert .................. H04N 7/014
345/418

(Continued)

FOREIGN PATENT DOCUMENTS

JP 2006-067214 A 3/2006
JP 2009-135598 A 6/2009

*Primary Examiner* — Manav Seth
(74) *Attorney, Agent, or Firm* — Cowan, Liebowitz & Latman, P.C.

(57) ABSTRACT

An image processing apparatus, determines, using a pixel signal included in a region referenced on a pixel of interest of a target image, a direction having a high signal correlation in the region, performs, using pixel signals from neighboring pixels of the pixel of interest based on a determination result, interpolation processing for interpolating a pixel signal of the pixel of interest, and performs reduction by reducing the number of pixels of the interpolated image, wherein the interpolation processing is executed according to a reduction rate used in the reduction, such that a high frequency component of the image decreases as a degree of reduction increases, while applying a weight to the pixel signal of a pixel, among the neighboring pixels, located in the direction determined as having the high correlation based on the determination result.

12 Claims, 11 Drawing Sheets (51) Int. Cl.
  *G06K 7/14*   (2006.01)
  *G06T 5/20*   (2006.01)
  *H04N 19/80*  (2014.01)
  *H04N 7/01*   (2006.01)
  *H04N 9/04*   (2006.01)
  *G06T 5/00*   (2006.01)
  *H04N 19/132* (2014.01)

(56) References Cited

U.S. PATENT DOCUMENTS

| | | | | |
|---|---|---|---|---|
| 5,920,356 A * | 7/1999 | Gupta | ................ | G06T 5/20 348/606 |
| 5,953,463 A * | 9/1999 | Tanaka | ................ | G06T 3/4007 358/451 |
| 6,002,810 A * | 12/1999 | Wakisawa | ................ | G06T 3/4007 345/660 |
| 6,389,180 B1 * | 5/2002 | Wakisawa | ................ | G06T 3/4007 345/660 |
| 6,760,489 B1 * | 7/2004 | Kuwata | ................ | G06T 3/4007 358/443 |
| 6,897,425 B2 * | 5/2005 | Osada | ................ | G06T 3/4007 250/208.1 |
| 7,092,582 B2 * | 8/2006 | Hier | ................ | G06T 3/4007 348/625 |
| 7,362,915 B2 * | 4/2008 | Vuylsteke | ................ | G06T 5/009 382/132 |
| 7,529,405 B2 * | 5/2009 | Masuno | ................ | H04N 1/58 382/162 |
| 7,941,006 B2 * | 5/2011 | Fuchigami | ................ | G06T 3/4007 345/698 |
| 7,949,204 B2 * | 5/2011 | Thoms | ................ | H04N 1/3935 358/1.2 |
| 8,169,510 B2 * | 5/2012 | Kondo | ................ | G06T 1/00 348/155 |
| 8,199,812 B2 * | 6/2012 | Ye | ................ | H04N 19/105 375/240.02 |
| 8,229,212 B2 * | 7/2012 | Siddiqui | ................ | G06T 3/4007 348/265 |
| 8,253,829 B2 * | 8/2012 | Kawashima | ................ | G06T 5/002 348/246 |
| 8,259,813 B2 * | 9/2012 | Hvidsten | ................ | G06T 7/408 345/589 |
| 8,305,458 B2 * | 11/2012 | Hara | ................ | H04N 9/045 345/600 |
| 8,659,673 B2 * | 2/2014 | Hara | ................ | H04N 9/045 348/222.1 |

* cited by examiner

| R | G1 | R | G1 | R | G1 |
|---|---|---|---|---|---|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

BAYER IMAGE SIGNAL

FIG. 5B

| 0 | G1 | 0 | G1 | 0 | G1 |
|---|---|---|---|---|---|
| G2 | 0 | G2 | 0 | G2 | 0 |
| 0 | G1 | 0 | G1 | 0 | G1 |
| G2 | 0 | G2 | 0 | G2 | 0 |
| 0 | G1 | 0 | G1 | 0 | G1 |
| G2 | 0 | G2 | 0 | G2 | 0 |

0-INSERTION G SIGNAL

FIG. 5C

| R | 0 | R | 0 | R | 0 |
|---|---|---|---|---|---|
| 0 | 0 | 0 | 0 | 0 | 0 |
| R | 0 | R | 0 | R | 0 |
| 0 | 0 | 0 | 0 | 0 | 0 |
| R | 0 | R | 0 | R | 0 |
| 0 | 0 | 0 | 0 | 0 | 0 |

0-INSERTION R SIGNAL

FIG. 5D

| 0 | 0 | 0 | 0 | 0 | 0 |
|---|---|---|---|---|---|
| 0 | B | 0 | B | 0 | B |
| 0 | 0 | 0 | 0 | 0 | 0 |
| 0 | B | 0 | B | 0 | B |
| 0 | 0 | 0 | 0 | 0 | 0 |
| 0 | B | 0 | B | 0 | B |

0-INSERTION B SIGNAL

H NYQUIST FREQUENCY

FIG. 11A
HV FILTER PROCESSING 100%

FIG. 11B
DIRECTIONAL
DETERMINATION
FORMULAS (1) to (4)
COMBINING RATIO: LARGE

FIG. 11C
DIRECTIONAL
DETERMINATION
FORMULAS (1) to (4)
COMBINING RATIO: SMALL

FIG. 11D
DIRECTIONAL
DETERMINATION
FORMULAS (5) to (8)
COMBINING RATIO: LARGE

FIG. 11E
DIRECTIONAL
DETERMINATION
FORMULAS (5) to (8)
COMBINING RATIO: SMALL

IMAGE PROCESSING APPARATUS, IMAGE PROCESSING METHOD, AND NON-TRANSITORY COMPUTER READABLE STORAGE MEDIUM

BACKGROUND OF THE INVENTION

Field of the Invention

The present invention relates to an image processing apparatus, an image processing method, and a non-transitory computer readable storage medium.

Description of the Related Art

In an image capturing apparatus such as a digital camera, when shooting a video or when displaying a live viewing image, it is desirable to reduce the size of pixels in an image signal and perform development processing as early as possible in the processing. The object is to reduce the scale of the development circuit and to suppress power consumption to a low level. The reduction processing at this time can be performed during readout by summing/thinning out pixels on an image sensor, or otherwise subsequently with the development circuit. Also, in the case in which the image size for video recording in full HD, QFHD or the like is different from the pixel size read out from the image sensor, enlargement or reduction of the size of pixels in the image signal is performed within the circuit, for example.

A decrease in image quality is brought about if reduction is performed using simple linear interpolation, for example, in order to reduce the image signal. In contrast, in Japanese Patent Laid-Open No. 2009-135598 and Japanese Patent Laid-Open No. 2006-67214, a reduced image that has retained its sharpness is generated by determining the direction of change between pixels and performing interpolation on the thinned out pixels.

However, no method of interpolating pixels according to a reduction rate is described in Japanese Patent Laid-Open No. 2009-135598 or Japanese Patent Laid-Open No. 2006-67214, and therefore there is a concern that, depending on the reduction rate, the sharpness will deteriorate greatly and that a large amount of aliasing will appear. Particularly, in the case in which reduction is performed at a magnification approximating equal magnification, if a filter with a narrow pixel reference range is used the desired bandwidth limiting cannot be performed due to limitations of the filter characteristics, and the sharpness of the reduced image signal deteriorates. For example, there are cases in which aliasing appears.

In contrast, it is also conceivable to perform bandwidth limiting using a filter with a wide pixel reference range. However, if such a filter is mounted to a circuit, the memory capacity for holding pixel signal values used by the filter increases, and the scale of the circuit increases.

SUMMARY OF THE INVENTION

Thus, the present invention provides image processing technology with which, in the case in which the reduction rate has changed, it is possible to obtain a reduced image in which aliasing is mitigated while providing sharpness, without using a filter with a wide reference range.

One of embodiments of the invention relates to an image processing apparatus, comprising an interpolation unit configured to determine, using a pixel signal included in a region referenced on a pixel of interest of an image, a direction having a high signal correlation in the region, and to perform, using pixel signals from neighboring pixels of the pixel of interest based on a result of the determination, interpolation processing for interpolating a pixel signal of the pixel of interest, and a reduction unit configured to perform reduction by reducing the number of pixels of the image interpolated by the interpolation unit, wherein the interpolation unit executes the interpolation processing according to a reduction rate used by the reduction unit, such that a high frequency component of the image decreases as a degree of reduction increases, while applying a weight to the pixel signal of a pixel, among the neighboring pixels, located in the direction determined as having the high correlation based on the result of the determination.

Further features of the present invention will become apparent from the following description of exemplary embodiments (with reference to the attached drawings).

DESCRIPTION OF THE EMBODIMENTS

Figure 1:
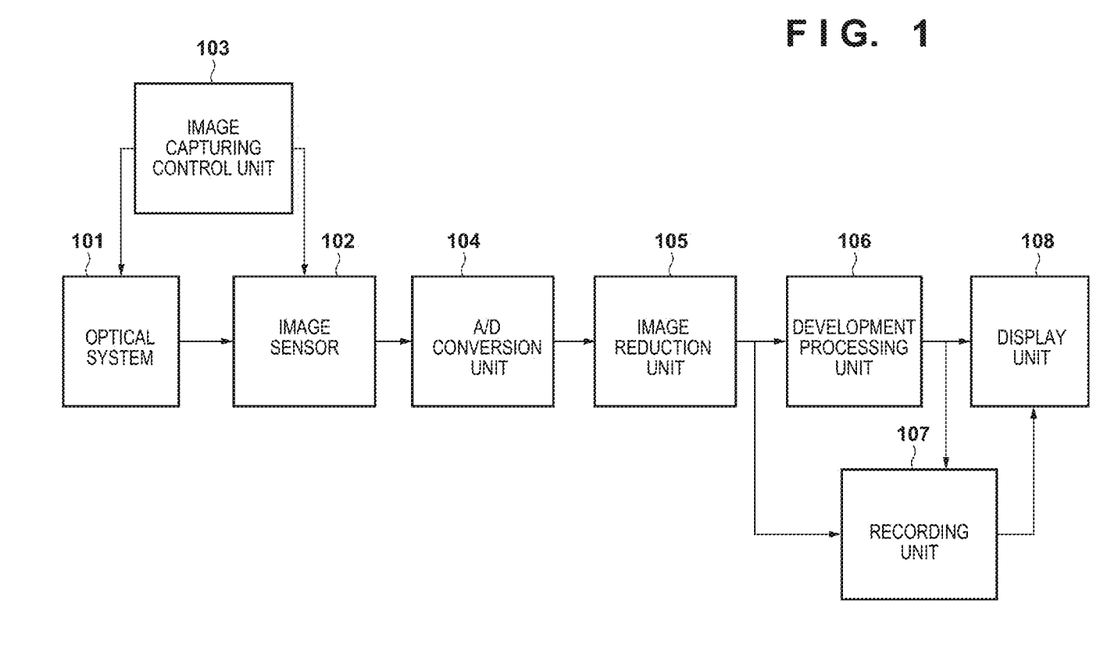
FIG. 1 is a diagram showing an example of a configuration of an image processing apparatus according to an embodiment of the invention.

Embodiments of the present invention will be described below with reference to the drawings. In the present embodiment, an image processing apparatus configured such as is shown in FIG. 1 is described as an example. The image processing apparatus is constituted by an optical system 101, an image sensor 102, an image capturing control unit 103, an A/D conversion unit 104, an image reduction unit 105, a development processing unit 106, a recording unit 107, and a display unit 108. The image processing apparatus can be realized as an image capturing apparatus such as a digital camera, for example. Also, apart from being a digital camera, the image processing apparatus can be an arbitrary information processing terminal or image capturing apparatus such as a personal computer, a mobile phone, a smartphone, a PDA, a tablet terminal, or a digital video camera, for example. Also, in the image processing apparatus in FIG. 1, excluding physical devices such as the image sensor and the display element, each block may be configured with hardware using a dedicated logic circuit and a memory. Alternatively, each block may be configured with software by a computer such as a CPU executing a processing program that is stored in the memory. Note that in the case in which a digital camera serving as the image processing apparatus is configured with an interchangeable lens that can be attached/removed like a single lens reflex camera, the constituent elements mounted to the interchangeable lens are excluded from the optical system 101.

Figure 5A:
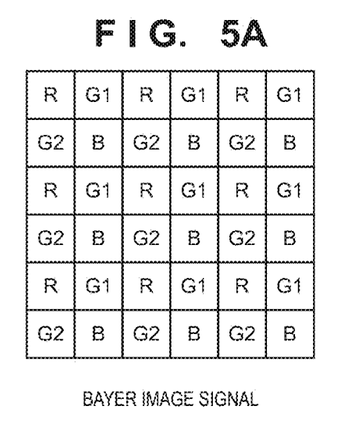
FIGS. 5A to 5D are diagrams illustrating a primary color Bayer array on an image sensor.

The optical system 101 can include a focus lens, an aperture, and a shutter. The image sensor 102 converts the light amount of a subject formed in the optical system 101 into an electric signal using photoelectric conversion, and is configured as an image sensor such as a CMOS or a CCD, for example. In the present embodiment, the case in which the image sensor has a primary color Bayer array of R, G1, G2, and B is described as an example. FIG. 5A shows an example of a Bayer array. The image capturing control unit 103 controls the focus lens, aperture and the shutter of the optical system 101, the imaging sensitivity of the image sensor 102, and the like. In the A/D conversion unit 104, the electric signal received from the image sensor 102 is converted into a digital signal. The image reduction unit 105 performs reduction processing and image signal conversion that correspond to the embodiment of the invention on the image signal received from the A/D conversion unit 104. The development processing unit 106 performs development processing such as gamma processing, noise reduction processing, and edge enhancement processing on the signal received from the image reduction unit 105. The recording unit 107 records the image signals received from the image reduction unit 105 and the development processing unit 106. The display unit 108 may, for example, be a liquid crystal display or the like, and displays the image signal received from the development processing unit 106 or displays the image signals recorded in the recording unit 107. The display unit 108 is, for example, arranged on the casing-side surface of the image processing apparatus and may also function as a touch panel display that accepts touch operations instead of only simply displaying images. A further detailed description of the configuration will be given with regard to only the characteristic parts in the present embodiment.

Figure 2:
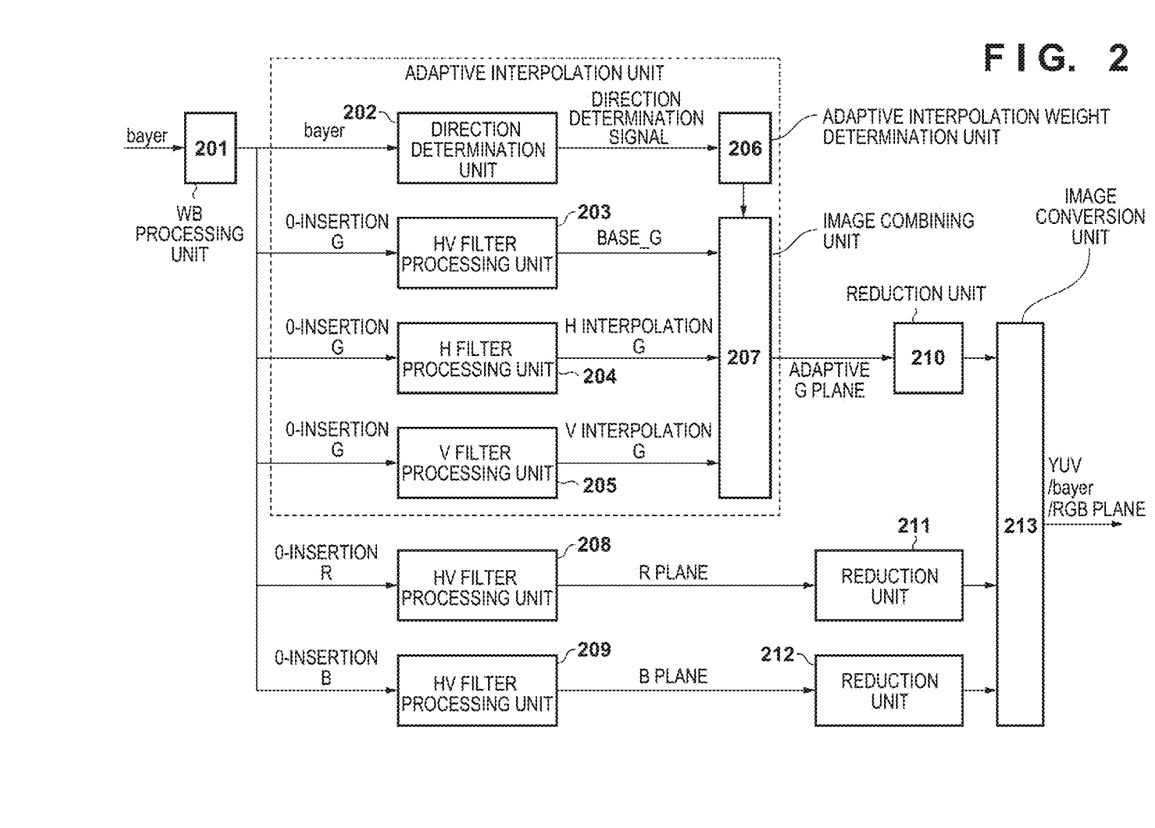
FIG. 2 is a diagram showing an example of a configuration of an image reduction unit according to the embodiment of the invention.
Figure 5B:
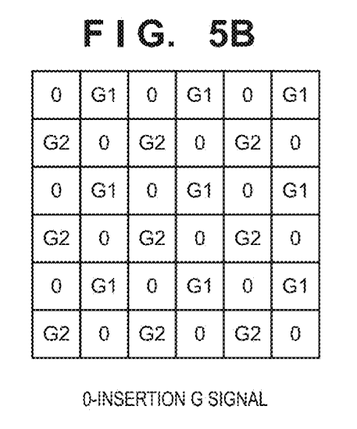
Figure 5C:
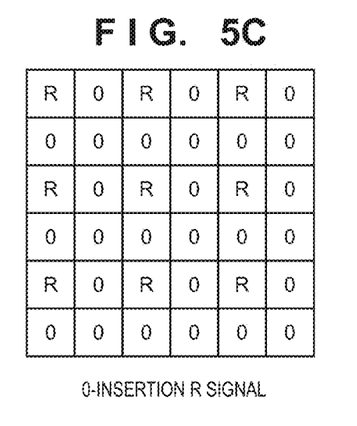
Figure 5D:
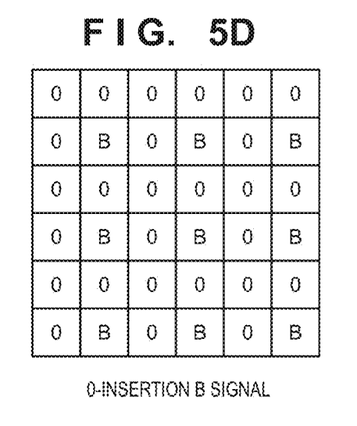

Next, a configuration and operations of the image reduction unit 105 corresponding to the embodiment of the invention will be described with reference to FIG. 2. FIG. 2 is a diagram showing an example of a detailed configuration of the image reduction unit 105. A WB processing unit 201 performs white balance processing by multiplying the red (R), green (G), and blue (B) color signals of an input Bayer image signal targeted for processing with a gain. The WB processing unit 201 outputs the Bayer image signal to a direction determination unit 202 and outputs 0-insertion G, R, and B signals to downstream filter processing units 203, 204, 205, 208, and 209. Note that, as shown in FIGS. 5A to 5D, the 0-insertion signals indicate image signals in which pixel positions other than specified colors are 0. Examples of the 0-insertion signals for R, G, and B are respectively as shown in FIGS. 5B to 5D.

The direction determination unit 202 determines the direction of the texture included in the image signal from the input Bayer image signal, and generates a direction determination signal indicating a direction having a high pixel signal correlation. HV filter processing units 203, 208, and 209 respectively perform filter processing in the horizontal and vertical directions on the input 0-insertion G, R, and B signals, and create a synchronized plane image. Note that synchronization refers to various types of signals being generated at the same pixel position. A H filter processing unit 204 performs filter processing in the horizontal direction on the 0-insertion G signal, and creates a synchronized G plane signal. The V filter processing unit 205 performs filter processing in the vertical direction on the 0-insertion G signal, and creates a synchronized G plane signal.

An adaptive interpolation weight determination unit 206 calculates the combining ratio of the G signals output from the HV filter processing unit 203, the H filter processing unit 204, and the V filter processing unit 205, based on the determination result of the direction determination indicated by the direction determination signal received from the direction determination unit 202. An image combining unit 207 combines the G signals that are output from the HV filter processing unit 203, the H filter processing unit 204, and the V filter processing unit 205, according to the combining ratio calculated by the adaptive interpolation weight determination unit 206, and creates an adaptive G plane image. Reduction units 210, 211, and 212 each perform reduction processing on the input plane image signal. An image conversion unit 213 performs image conversion processing on the reduced R, G, and B signals that are received from the reduction units 210, 211, and 212.

Figure 3:
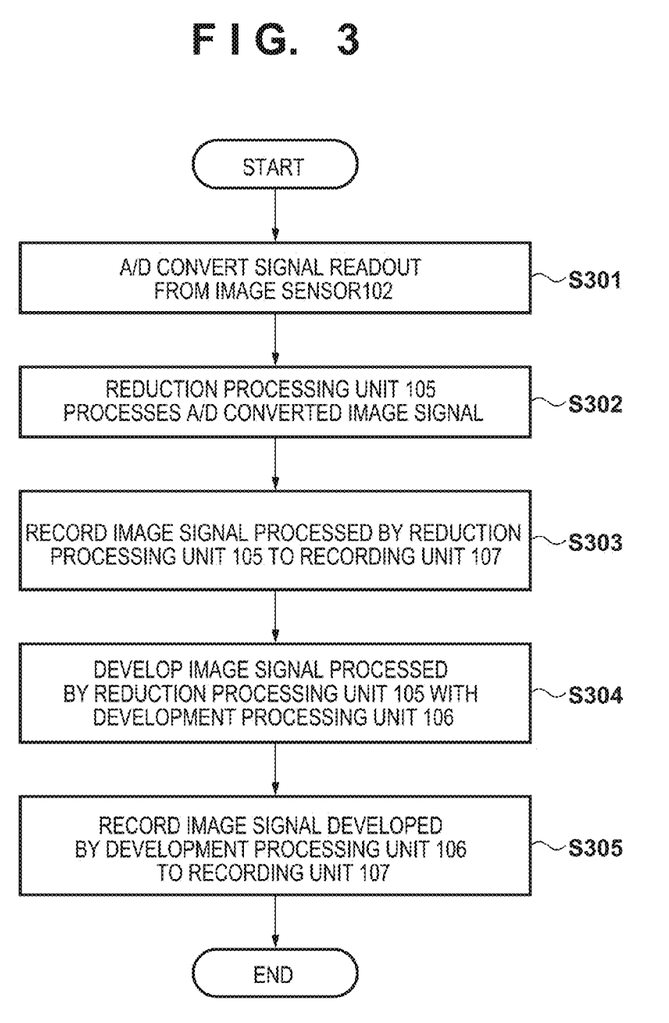
FIG. 3 is a flowchart showing an example of operations of the image processing apparatus according to the embodiment of the invention.

Next, operations of the image processing apparatus in the present embodiment will be described with reference to FIG. 3. FIG. 3 is a flowchart showing an example of operations of the image processing apparatus corresponding to the embodiment of the invention. Processing corresponding to the flowchart is, for example, realized by a CPU that functions as the respective blocks executing a corresponding program (stored in a ROM or the like).

First, in step S301, the A/D conversion unit 104 converts the analog image signal output by the image sensor 102 into a digital image signal. Next, in step S302, the image reduction unit 105 executes reduction processing on the digital image signal that has undergone A/D conversion, and subsequently performs image conversion processing to convert the image signal as necessary. Reduction processing is described in detail below with reference to the flowchart in FIG. 4. Next, in step S303, the image signal processed by the image reduction unit 105 is recorded by the recording unit 107. In step S304, development processing such as gamma processing, noise reduction processing, and edge enhancement processing are performed by the development processing unit 106 on the image signal processed by the image reduction unit 105. In step S305, the image signal that has undergone development processing and been output by the development processing unit 106 is recorded by the recording unit 107.

Figure 4:
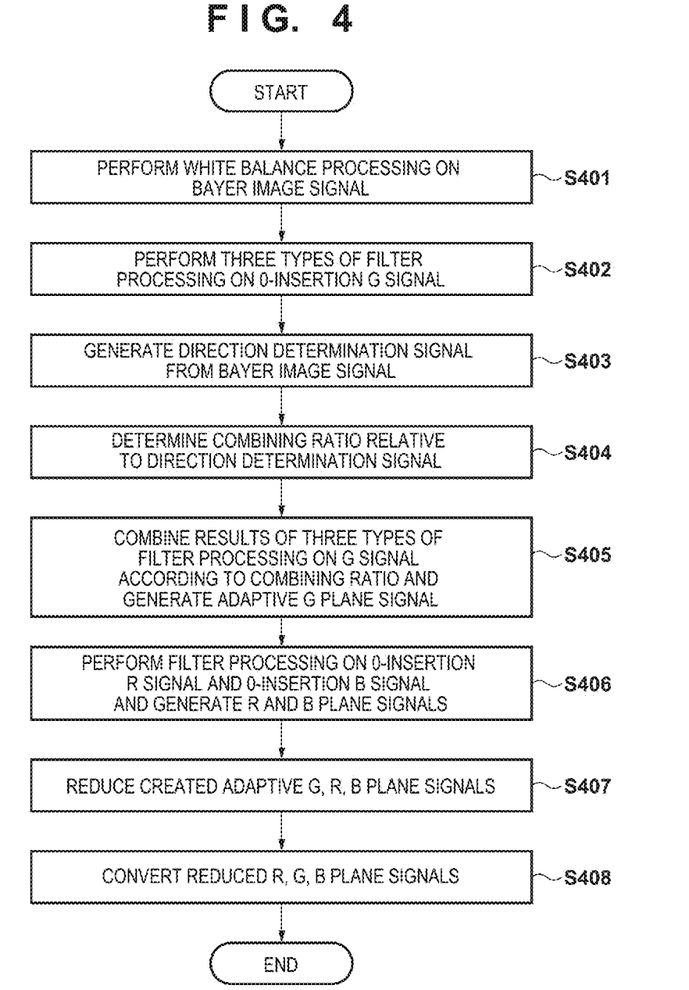
FIG. 4 is a flowchart showing an example of operations of the image reduction unit according to the embodiment of the invention.

Next, reduction processing and image conversion processing will be described in detail as processing executed by the image reduction unit 105 in step S303 described above, with reference to the flowchart in FIG. 4. FIG. 4 is a flowchart showing an example of reduction processing and image conversion processing corresponding to the embodiment of the invention. Processing corresponding to the flowchart is, for example, realized by a CPU that functions as the image reduction unit 105 executing a corresponding program (stored in a ROM or the like).

First, in step S401, the WB processing unit 201 performs white balance processing by multiplying the red (R), green (G), and blue (B) color signals of a Bayer image signal with a gain. It is sufficient to use a known technique for white balance processing in the WB processing unit 201, and therefore a detailed description thereof is omitted. Next, in step S402, the HV filter processing unit 203, the H filter processing unit 204, and the V filter processing unit 205 respectively perform filter processing on the 0-insertion G signal, and a synchronized G plane signal is generated.

For example, the HV filter processing unit 203 can perform (1, 4, 6, 4, 1) filter processing in each of the horizontal direction and the vertical direction. In this case, two pixels on the left and two pixels on the right in the horizontal direction and two pixels above and two pixels below in the vertical direction are the pixels that are targeted for filter processing, with a pixel of interest as the reference. For example, the H filter processing unit 204 can perform (1, 4, 6, 4, 1) filter processing in the horizontal direction, and the V filter processing unit 205 can perform (1, 4, 6, 4, 1) filter processing in the vertical direction. Note that when (1, 4, 6, 4, 1) filter processing is performed on the 0-insertion signal, synchronization is performed with (0, 4, 0, 4, 0) filter processing if the pixel of interest is the 0-insertion signal, and with (1, 0, 6, 0, 1) filter processing if the pixel of interest is not the 0-insertion signal.

As described above, in the HV filter processing unit 203, the H filter processing unit 204, and the V filter processing unit 205, a (1, 4, 6, 4, 1) filter is used, but it is desirable to change the frequency characteristics of the filters according to the reduction rate in the reduction units 210 to 212. In consideration of aliasing, a filter is used that more robustly performs bandwidth limiting by, for example, increasing the weighting that is applied to neighboring pixels, increasing the number of neighboring pixels, or the like the more an image is reduced, such that the frequency bandwidth is at the low frequency end.

Figure 6A:
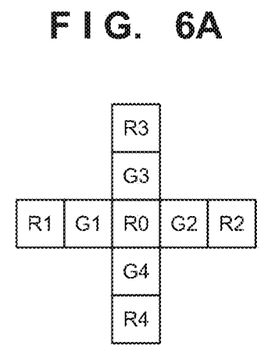
FIGS. 6A to 6D are diagrams for illustrating a method of generating a direction determination signal according to the embodiment of the invention.

Next, in step S403, the direction determination unit 202 creates a direction determination signal from the Bayer image signal. The method for creating the direction determination signal will be described with reference to FIGS. 6A to 6D. The direction determination signal is calculated for each pixel of an image signal. First, the method for creating the direction determination signal in the case in which the pixel of interest is R will be described. In the case in which the pixel of interest is R, a direction determination signal Pa is created as in an equation (1) using the pixels shown in FIG. 6A.

$$Pa=|2R0-R1-R2|+|G2-G1|-|2R0-R3-R4|-|G4-G3| \quad (1)$$

Figure 6B:
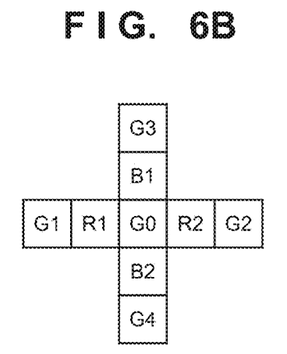
Figure 6C:
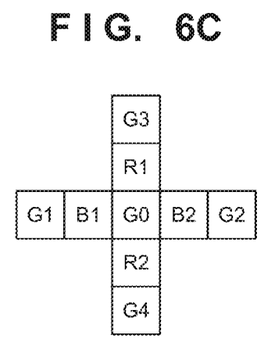
Figure 6D:
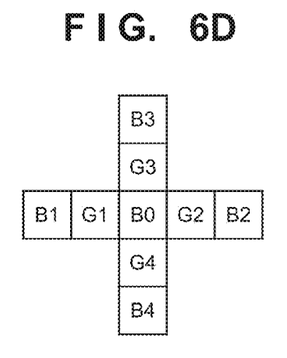

Similarly, if the positional relationship between the pixel of interest and the color signals of the neighboring pixels is that of FIGS. 6B, 6C, and 6D, a direction determination signal is created as in equations (2), (3), and (4), respectively.

$$Pb=|2G0-G1-G2|+|R2-R1|-|2G0-G3-G4|-|B2-B1| \quad (2)$$

$$Pc=|2G0-G1-G2|+|B2-B1|-|2G0-G3-G4|-|R2-R1| \quad (3)$$

$$Pd=|2B0-B1-B2|+|G2-G1|-|2B0-B3-B4|-|G4-G3| \quad (4)$$

The equations (1) to (4) indicate differences between an absolute value resulting from applying the band-pass filter in the horizontal direction and an absolute value resulting from applying the band-pass filter in the vertical direction. The direction having a high pixel signal correlation and the strength of the correlation can be determined based on the sign and the size of the calculated value. In the case of the texture being in the vertical direction, the value resulting from applying the band-pass filter in the horizontal direction will be dominant, and thus the value will increase. On the other hand, in the case of the texture being in the horizontal direction, the value resulting from applying the band-pass filter in the vertical direction will be dominant, and thus the value will decrease. Note that performing white balance gain processing with the WB processing unit 201 is for aligning the gains for R, G, and B such that the values of the determination signals do not vary depending on the color of the pixel of interest.

Figure 7A:
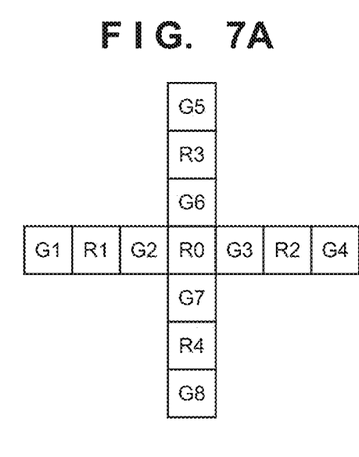
FIGS. 7A to 7D are other diagrams for illustrating a method of generating a direction determination signal according to the embodiment of the invention.

Also, methods for calculating the direction determination signal other than the equations (1) to (4) may be applied. For example, as shown in FIGS. 7A to 7D, the number of reference pixels that are to be used in the determination can be increased by two pixels each in the horizontal direction and the vertical direction. With the increase in the number of reference pixels, the equations are transformed into equations (5) to (8) below. In the case in which the pixel of interest is R, the direction determination signal Pa can be created as shown in the equation (5) using the pixels shown in FIG. 7A.

$$Pa=|2R0-R1-R2|+|(G1+3G2-3G3-G4)/2|-|2R0-R3-R4|-|(G5+3G6-3G7-G8)/2| \quad (5)$$

Figure 7B:
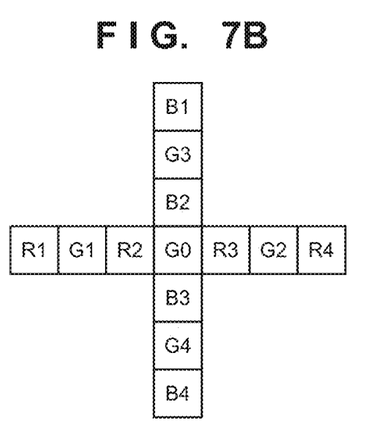
Figure 7C:
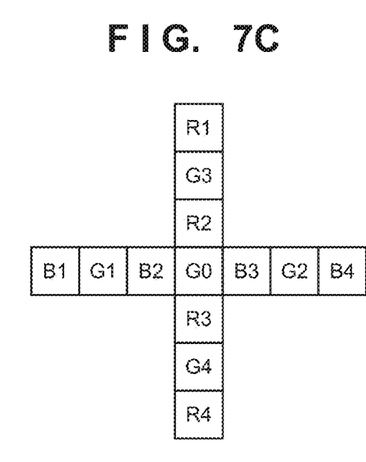
Figure 7D:
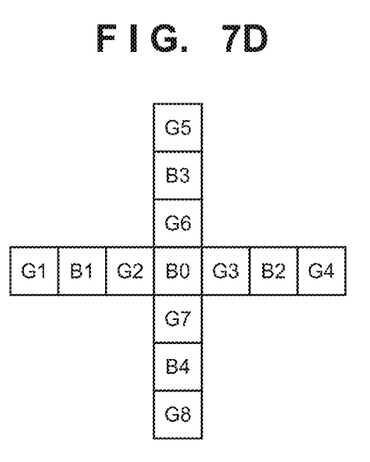

Similarly, if the positional relationship between the pixel of interest and the color signals of the neighboring pixels is that of FIGS. 7B, 7C, and 7D direction determination signals are created as in equations (6), (7), and (8), respectively.

$$Pb=|2G0-G1-G2|+|(R1+3R2-3R3-R4)/2|-|2G0-G3-G4|-|(B1+3B2-3B3-B4)/2| \quad (6)$$

$$Pc=|2G0-G1-G2|+|(B1+3B2-3B3-B4)/2|-|2G0-G3-G4|-|(R1+3R2-3R3-R4)/2| \quad (7)$$

$$Pd=|2B0-B1-B2|+|(G1+3G2-3G3-G4)/2|-|2B0-B3-B4|-|(G5+3G6-3G7-G8)/2| \quad (8)$$

Figure 8A:
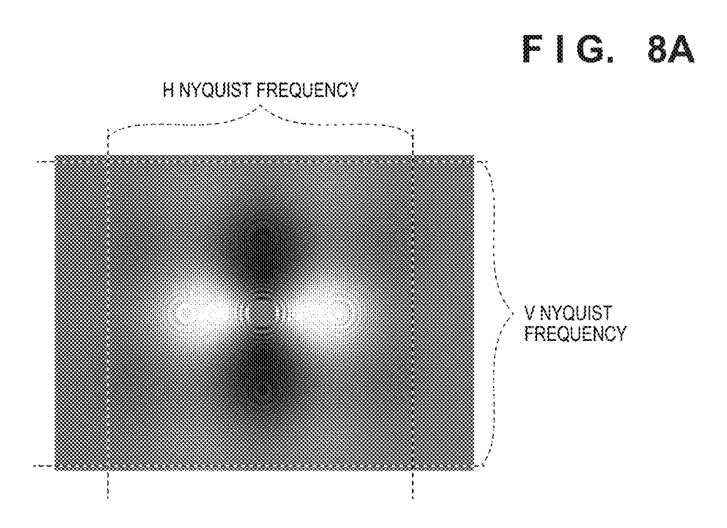
FIGS. 8A and 8B are diagrams showing an example of a direction determination signal according to the embodiment of the invention.
Figure 8B:
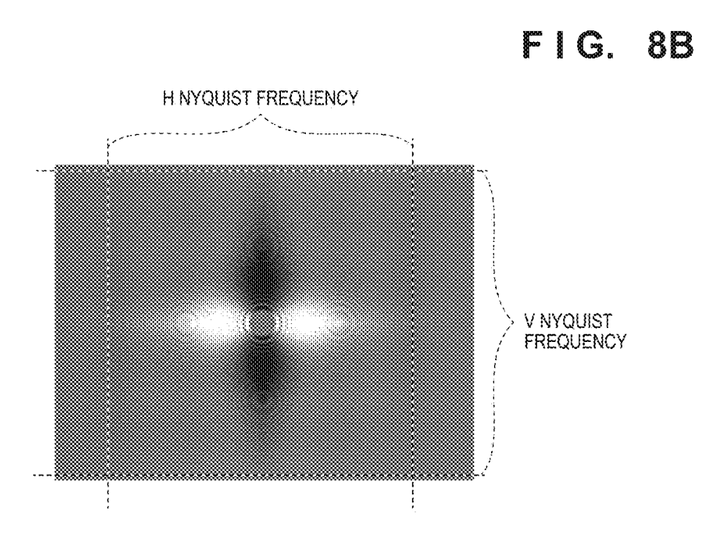

Here, FIG. 8A shows the result of calculating the direction determination signal by applying the equations (1) to (4) to the Bayer image signal obtained from capturing an image of a CZP (a Circular Zone Plate), and FIG. 8B shows the result of calculating the direction determination signal by applying the equations (5) to (8). The parts in which the direction determination signal is 0 are grey, and the larger the direction determination signal (i.e. texture exists in the vertical direction) the whiter the part, and the smaller the direction determination signal (i.e., texture exists in the horizontal direction) the blacker the part.

The more a CZP (Circular Zone Plate) moves toward an edge the more high-frequency components are included, and the dashed lines in FIG. 8 indicate Nyquist frequencies relative to pixel sampling in the horizontal direction and pixel sampling in the vertical direction. When FIG. 8A and FIG. 8B are compared, the frequency at which the direction determination signal is detected differs, and as a result the proportion of the whole occupied by the black region and the white region differs. Specifically, the area of the black region and the white region is larger in FIG. 8A, and the proportion covered by the gray area is larger in FIG. 8B. This is due to a difference in band-pass filter characteristics between the equations (1) to (4) and the equations (5) to (8). When creating a direction determination signal, it is sufficient to determine the characteristics of the band-pass filter in consideration of the Nyquist frequency of pixel sampling after reduction, such that aliasing does not appear in the reduced image. This is because a region with a higher frequency than the Nyquist frequency after reduction will be aliased, and thus it is desirable to perform bandwidth limiting with HV filter processing without performing filtering that has directionality so that the high frequency region is not resolved. In other words, it is sufficient to create a direction determination signal using a band-pass filter that detects lower frequencies such as is shown in the equations (5) to (8) the more an image is reduced.

Figure 9A:
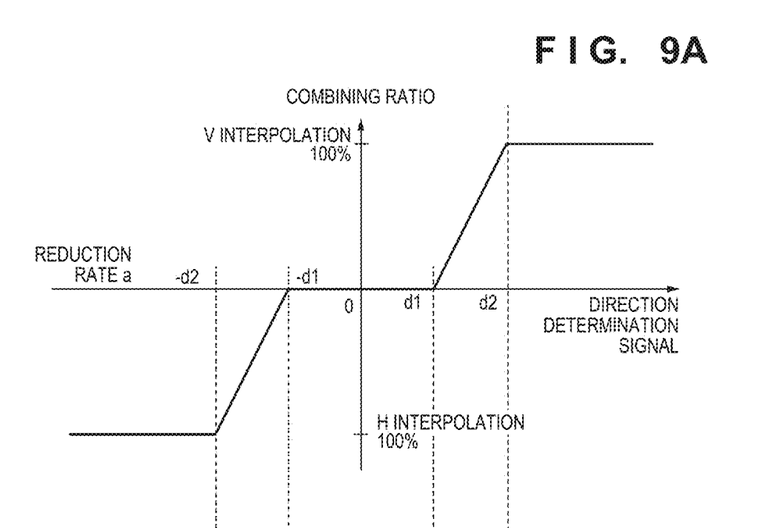
FIGS. 9A and 9B are diagrams showing an example of a relationship between the direction determination signal and a combining ratio according to the embodiment of the invention.
Figure 9B:
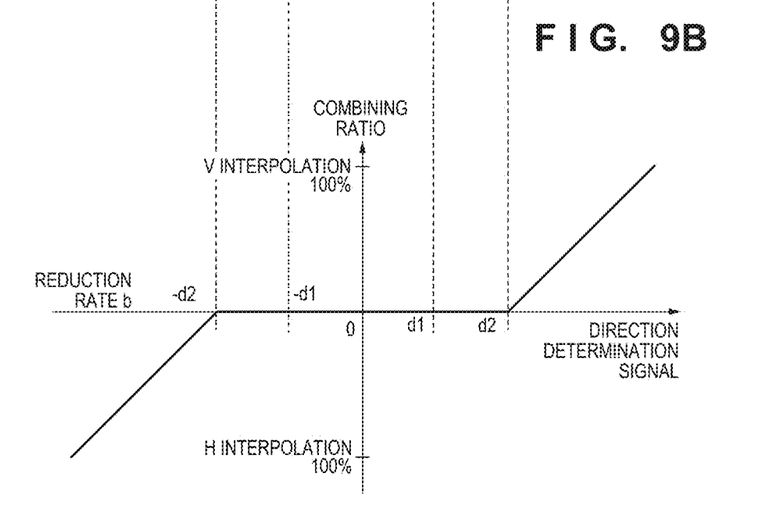

Next in step S404, the adaptive interpolation weight determination unit 206 calculates a combining ratio for the G signals that are output based on the direction determination signal created in step S403 from the HV filter processing unit 203, the H filter processing unit 204, and the V filter processing unit 205. FIGS. 9A and 9B show a method for calculating the combining ratio. The horizontal axis indicates the direction determination signal calculated in step S403, and the vertical axis indicates the combining ratio. Note that when the combining ratio shown on the vertical axis in FIGS. 9A and 9B is zero, this indicates that the combining ratio of the signal output from the HV filter processing unit 203 is 100 percent. In other words, a G signal that has undergone similar filter processing in the horizontal direction and the vertical direction is used for a portion determined to be neither in the vertical direction or the horizontal direction. Because the texture appears more robustly in the vertical direction as the value of the direction determination signal increases in the positive region, combination of the image signals output from the HV filter processing unit 203 and the V filter processing unit 205 is performed. Because the texture appears more robustly in the horizontal direction as the value of the direction determination signal increases in the negative region, combination of the image signals output from the HV filter processing unit 203 and the H filter processing unit 204 is performed. In other words, the combining ratio of the image signal output from the V filter processing unit 205 increases as the direction determination signal increases, and the combining ratio of the image signal output from the H filter processing unit 204 increases as the direction determination signal decreases.

By thus performing filter processing that corresponds to the direction of the texture, it is possible to maintain the sharpness of the texture. Note that, as shown in FIGS. 9A and 9B, it is possible to adjust the sharpness by changing the relationship between the direction determination signal and the combining ratio. FIG. 9A and FIG. 9B are graphs showing an example of a relationship between the direction determination signal and the combining ratio in the case of reduction rates a and b (a>b), respectively. In these examples, the reduction rate b is smaller than the reduction rate a, and thus the degree of reduction is larger.

In the case of FIG. 9A, if a value P of the direction determination signal is $-d1<P<d1$, the combining ratio is 0 percent and only the signal output from the HV filter processing unit 203 is selected. Also, if $d1 \le P \le d2$, combination of the image signals output from the HV filter processing unit 203 and the V filter processing unit 205 is performed. If $-d2 \le P \le -d1$, combination of the image signals output from the HV filter processing unit 203 and the H filter processing unit 204 is performed. Furthermore, if $d2<P$, only the image signal output from the V filter processing unit 205 is selected. Also, if $P<-d2$, only the image signal output from the H filter processing unit 204 is selected.

In contrast, in the case of FIG. 9A, the degree of reduction is larger, and therefore there is a decrease in the degree of combination of the pixel signals output from the H filter processing unit 204 and the V filter processing unit 205. Specifically, in the range in which the value P of the direction determination signal is $-d2<P<d2$, the combining ratio is 0 percent, and only the signal output from the HV filter processing unit 203 is selected. In other words, in comparison to the case of FIG. 9A, the range of the directional signal obtained by selecting only the signal output from the HV filter processing unit 203 is large. Furthermore, if $d2<P$, combination of the image signals from the HV filter processing unit 203 and the V filter processing unit 205 is performed. Also, if $P<-d2$, combination of the image signals output from the HV filter processing unit 203 and the H filter processing unit 204 is performed.

In this way, weighted addition of the results of interpolation in the horizontal direction or the vertical direction is possible by combining the output result from the HV filter processing unit 203 with the output result from the H filter processing unit 204 or the V filter processing unit 205 according to the determination result of directional determination. On the other hand, in the case in which the degree of reduction is large, the weight in the horizontal and vertical directions is reduced, and preference is given to the signal output from the HV filter processing unit 203.

Figure 10A:
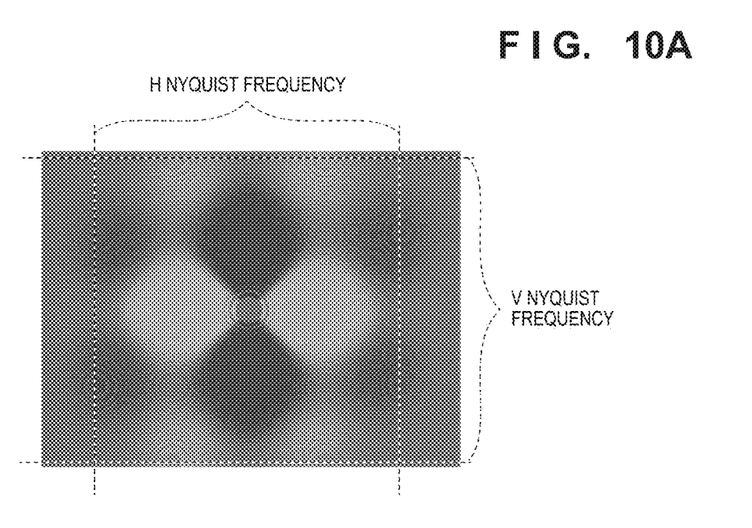
FIGS. 10A and 10B are diagrams showing an example of a combining ratio according to the embodiment of the invention.
Figure 10B:
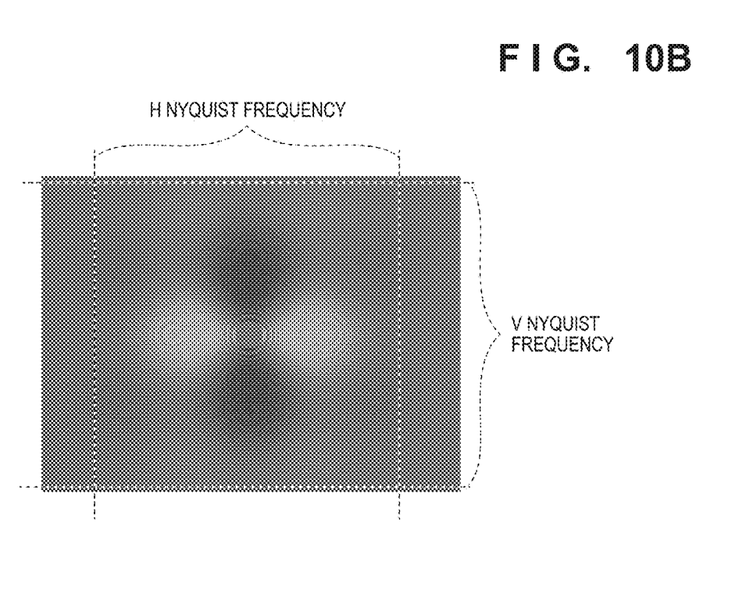

Here, FIGS. 10A and 10B show examples in which the relationship of the combining ratio relative to the direction determination signal in FIG. 8A has changed. The combining ratio on the vertical axis in FIGS. 9A and 9B is zero, i.e., the portion in which the combining ratio of the signal output from the HV filter processing unit 203 is 100 percent is grey. Portions become whiter as the combining ratio of the image signal output from the V filter processing unit 205 increases, and become blacker as the combining ratio of the image signal output from the H filter processing unit 204 increases. In FIG. 10A, the combining ratio of the image signal output from the H filter processing unit 204 or the V filter processing unit 205 has increased in comparison to FIG. 10B. In other words, FIG. 9A provides a greater sharpness than FIG. 9B, and FIG. 10A provides a greater sharpness than FIG. 10B. That is to say, FIG. 9B and FIG. 10B have a larger degree of reduction, and the sharpness is suppressed by a corresponding amount. The relationship of the combining ratio relative to the direction determination signal is desirably changed according to the reduction rate and the band-pass filter characteristics used when creating the direction determination signal. Adjustment of aliasing and sharpness can be performed more broadly by changing both the band-pass filter characteristics used when creating the direction determination signal and the relationship of the combining ratio relative to the direction determination signal.

Then, in step S405, the G signals output from the HV filter processing unit 203, the H filter processing unit 204, and the V filter processing unit 205 are combined in the image combining unit 207 according to the combining ratio calculated in step S404, and an adaptive G plane signal is created.

Next in step S406, (1, 4, 6, 4, 1) filter processing is performed on the 0-insertion R and B signals in the horizontal direction and the vertical direction with the HV filter processing units 208 and 209, and synchronized R and B plane signals are created. In the present embodiment, (1, 4, 6, 4, 1) filter processing is used, but in consideration of aliasing, a filter is used that more robustly performs bandwidth limiting of a high frequency the more the image is reduced, similarly to the G-plane HV filter processing unit 203.

Then, in step S407, reduction of the adaptive G plane signal, the R plane signal, and the B plane signal is performed respectively in the reduction units 210 to 212. Regarding reduction, it is sufficient to perform linear interpolation processing with weighting that corresponds to the pixel sampling position before and after reduction, for example. Alternatively, reduction may be performed using other processing such as bicubic interpolation, or other methods may be employed.

FIGS. 11A to 11E show an adaptive G plane image that has been reduced by 70 percent as a result of linear interpolation by the reduction unit 210.

Figure 11A:
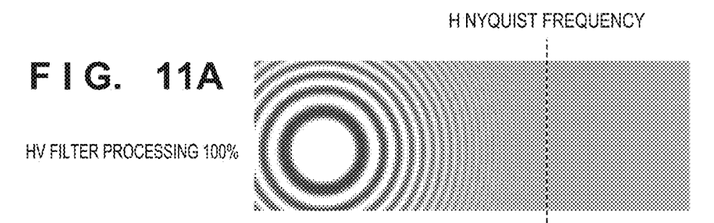
FIGS. 11A to 11E are diagrams showing an example of an adaptive G plane image that has undergone reduction according to the embodiment of the invention.

FIG. 11A shows the result obtained using 100 percent of the signal output from the HV filter processing unit 203.

Figure 11B:
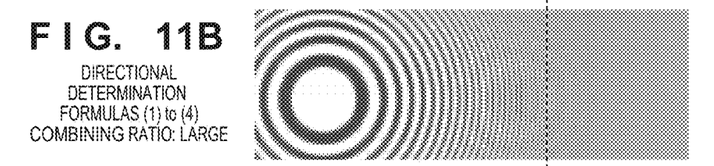

FIG. 11B shows the result obtained by calculating the direction determination signal using the equations (1) to (4) and setting the combining ratio of the image signal output from the H filter processing unit 204 or the V filter processing unit 205 relative to the direction determination signal to be large.

Figure 11C:
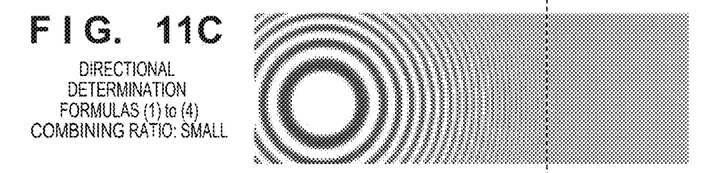

FIG. 11C shows the result obtained by calculating the direction determination signal using the equations (1) to (4) and setting the combining ratio of the image signal output from the H filter processing unit 204 or the V filter processing unit 205 relative to the direction determination signal to be smaller than that in FIG. 11B.

Figure 11D:
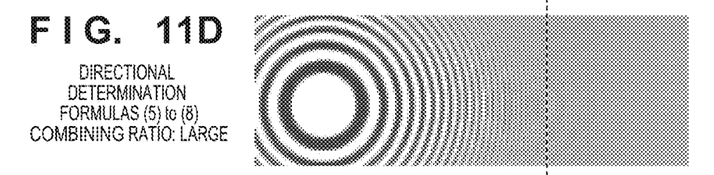

FIG. 11D shows the result obtained by calculating the direction determination signal using the equations (5) to (8) and setting the combining ratio of the image signal output from the H filter processing unit 204 or the V filter processing unit 205 relative to the direction determination signal to be the same as that in FIG. 11B.

Figure 11E:
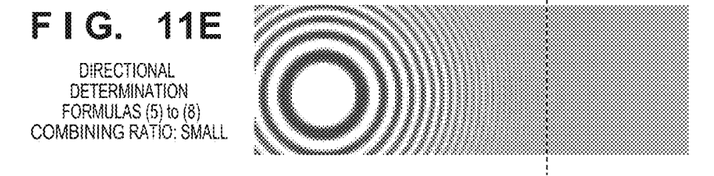

FIG. 11E shows the result obtained by calculating the direction determination signal using the equations (5) to (8) and setting the combining ratio of the image signal output from the H filter processing unit 204 or the V filter processing unit 205 relative to the direction determination signal to be smaller than that in FIG. 11B.

In FIG. 11A, interpolation processing that corresponds to the direction has not been performed and therefore there appears to be a lack of sharpness, and in FIG. 11B, sharpness is high but aliasing of frequencies that exceed the Nyquist frequency is prominent. In contrast, by changing either one of or both the band-pass filter characteristics used when creating a direction determination signal according to the reduction rate or the combining ratio relationship relative to the direction determination signal such in the present embodiment, an adaptive G plane image signal in which aliasing is mitigated while providing sharpness such as is shown in FIGS. 11C to 11E can be obtained. In other words, it is sufficient to create a direction determination signal using a band-pass filter that detects lower frequencies such as is shown in the equations (5) to (8) as the reduction rate decreases (as the degree of reduction increases). Also, it is sufficient to reduce the combining ratio and give preference to the signal output from the HV filter processing unit 203 as the reduction rate decreases.

Lastly, in step S408, the adaptive G plane signal, the R plane signal, and the B plane signal that were reduced in step S407 are converted in the image conversion unit 213. Conversion refers to processing such as performing sampling in the Bayer color array order from the R, G, and B plane images described above and generating a Bayer image signal, or creating YUV signals using equations (9) to (11).

$$Y=0.299 \times R+0.587 \times G+0.114 \times B \quad (9)$$

$$U=0.169 \times R-0.331 \times G+0.500 \times B \quad (10)$$

$$V=0.500 \times R-0.419 \times G+0.081 \times B \quad (11)$$

It is sufficient to change the conversion processing according to the format used when saving a reduced image signal to the recording unit 107, or to the format of an image input to the development processing unit 106. Alternatively, in the case where it is desirable to not lose image signal information, it is sufficient to record the RGB plane image signals as is without performing conversion.

In the present invention as described above, by changing one of or both the band-pass filter characteristics used when creating a direction determination signal or the relationship of the combining ratio relative to the direction determination signal according to the reduction rate, an adaptive G plane image signal adjusted for aliasing and sharpness can be obtained.

In the present embodiment, both the band-pass filter characteristics and the relationship of the combining ratio relative to the direction determination signal were changed according to the reduction rate, but as shown in the images in FIGS. 11B to 11E, there is an effect even if only one is changed.

Also, the maximum reference range of the filter when the adaptive G plane is created will be either that of the band-pass filter used in the direction determination unit 202 or that of the filters used by the HV filter processing unit 203, the H filter processing unit 204, and the V filter processing unit 205. Even if there are limitations on the types of filter for the HV filter processing unit 203, it is possible to robustly apply bandwidth limiting with the HV filter processing unit 203, and to supplement portions lacking in sharpness by adjusting the combining ratio of the signals output by the H filter processing unit 204 or the V filter processing unit 205. Accordingly, aliasing and the sharpness can be adjusted with filter processing that has a relatively narrow reference range, even if the reduction rate changes.

Note that the present invention is not limited to the embodiment described above, and various improvements and design changes may be made without departing from the spirit of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242302, filed on Nov. 28, 2014 which is hereby incorporated by reference herein in its entirety.

What is claimed is:

1. An image processing apparatus, comprising a CPU that functions as:
an interpolation unit configured to determine, using a pixel signal included in a region referenced on a pixel of interest of an image, a direction having a high signal correlation in the region, and to perform, using pixel signals from neighboring pixels of the pixel of interest based on a result of the determination, interpolation processing for interpolating a pixel signal of the pixel of interest; and
a reduction unit configured to perform reduction by reducing the number of pixels of the image interpolated by the interpolation unit,
wherein the interpolation unit executes the interpolation processing according to a reduction rate used by the reduction unit, such that a high frequency component of the image decreases as a degree of reduction increases, while applying a weight to the pixel signal of a pixel, among the neighboring pixels, located in the direction determined as having the high correlation based on the result of the determination.

2. The image processing apparatus according to claim 1, wherein the interpolation unit reduces the weight to be applied to the pixel signal of the pixel located in the direction that is determined as having the high correlation as the degree of reduction increases.

3. The image processing apparatus according to claim 1, wherein the interpolation unit reduces the high frequency component by increasing the number of neighboring pixels of the pixel of interest as the degree of reduction increases.

4. The image processing apparatus according to claim 1, wherein the interpolation unit reduces the high frequency component by increasing, in relationship with the pixel of interest, the weight of the neighboring pixels of the pixel of interest as the degree of reduction increases.

5. The image processing apparatus according to claim 1, wherein the interpolation unit sets a frequency bandwidth of a filter that is used for determining the direction having the high signal correlation to a low frequency end as the degree of reduction increases.

6. The image processing apparatus according to claim 5, wherein the interpolation unit sets the frequency bandwidth of the filter to the low frequency end by increasing the number of reference pixels in a direction that is targeted for determination.

7. The image processing apparatus according to claim 1, wherein the interpolation unit executes
first interpolation processing for interpolating the pixel signal of the pixel of interest using the pixel signals of horizontal and vertical neighboring pixels of the pixel of interest,
second interpolation processing for interpolating the pixel signal of the pixel of interest using the pixel signals of vertical neighboring pixels of the pixel of interest, and
third interpolation processing for interpolating the pixel signal of the pixel of interest using the pixel signals of horizontal neighboring pixels of the pixel of interest, and
changes a combining ratio for combining a result of the first interpolation processing and a result of the second or third interpolation processing according to the degree of reduction, and increases a proportion of the result of the first interpolation processing that is combined as the degree of reduction increases.

8. The image processing apparatus according to claim 7, wherein the interpolation unit determines one of the horizontal direction and the vertical direction to be the direction having the high correlation based on the result of the determination, and
applies the weight to the pixel signal of the pixel located in the direction determined as having the high correlation by combining the result of the first interpolation processing with the result of whichever of the second interpolation processing and the third interpolation processing corresponds to the determined direction.

9. The image processing apparatus according to claim 1, wherein the image has a primary color Bayer array, and
the interpolation unit performs the interpolation processing on a green pixel signal.

10. An image processing apparatus, comprising an ASIC that functions as:
an interpolation unit configured to determine, using a pixel signal included in a region referenced on a pixel of interest of an image, a direction having a high signal correlation in the region, and to perform, using pixel signals from neighboring pixels of the pixel of interest based on a result of the determination, interpolation processing for interpolating a pixel signal of the pixel of interest; and
a reduction unit configured to perform reduction by reducing the number of pixels of the image interpolated by the interpolation unit,
wherein the interpolation unit executes the interpolation processing according to a reduction rate used by the reduction unit, such that a high frequency component of the image decreases as a degree of reduction increases, while applying a weight to the pixel signal of a pixel, among the neighboring pixels, located in the direction determined as having the high correlation based on the result of the determination result.

11. An image processing method, comprising:
an interpolation step of determining, using a pixel signal included in a region referenced on a pixel of interest of an image, a direction having a high signal correlation in the region, and to perform, using pixel signals from neighboring pixels of the pixel of interest based on a result of the determination, interpolation processing for interpolating a pixel signal of the pixel of interest; and
a reduction step of performing reduction by reducing the number of pixels of the image interpolated in the interpolation step,
wherein in the interpolation step, the interpolation processing is executed according to a reduction rate used in the reduction step, such that a high frequency component of the image decreases as a degree of reduction increases, while a weight is applied to the pixel signal of a pixel, among the neighboring pixels, located in the direction determined as having the high correlation based on the result of the determination.

12. A non-transitory computer readable storage medium on which is stored a program causing an image processing apparatus to perform operations of:
- determining, using a pixel signal included in a region referenced on a pixel of interest of an image, a direction having a high signal correlation in the region, and performing, using pixel signals from neighboring pixels of the pixel of interest based on a result of the determination, interpolation processing for interpolating a pixel signal of the pixel of interest; and
- performing reduction by reducing the number of pixels of the image interpolated in the interpolation step,
- wherein in the interpolation step, the interpolation processing is executed according to a reduction rate used in the reduction step, such that a high frequency component of the image decreases as a degree of reduction increases, while a weight is applied to the pixel signal of a pixel, among the neighboring pixels, located in the direction determined as having the high correlation based on the result of the determination.

* * * * *